Dec. 13, 1966 H. LIVINGSTON 3,291,640

ULTRASONIC CLEANING PROCESS

Filed May 27, 1963

United States Patent Office 3,291,640

Patented Dec. 13, 1966

3,291,640

ULTRASONIC CLEANING PROCESS

Howard Livingston, College Point, N.Y., assignor to Chemclean Corporation, College Point, N.Y.

Filed May 27, 1963, Ser. No. 283,510
6 Claims. (Cl. 134—1)

This invention relates to the cleaning of sealed metallic elements recessed in capillary tubing and more particularly to the removal of flux and oxides from partially prepared diodes.

In the manufacture of computers a vast number of tiny, about one quarter inch in over-all length, diodes are used to rectify alternating current into direct current.

These conventional diodes are made in part by first sealing borate flux coated dumet wire into a tiny glass capillary tube. Conventional dumet wire consists of an iron nickel core surrounded by a copper coating.

The dumet wire protrudes into the capillary a millimeter or two or there about and the copper therefor becomes oxidized during the sealing process to a glass capillary tubing.

Such a coated electrode is useless as a conductor of electrical current unless it is first cleaned of its flux and oxide coating.

Since this coating is a borate flux it itself is of a glassy nature and hence very difficult to remove.

The prior art manner of removing this flux coating on the tiny protuberant electrode deep within the capillary tube was to deposit a handful of these partially prepared diode elements in a container of hot or boiling acid and leave them in this condition for several minutes hoping that the hot acid would replace the air in the capillary and then attack the flux-oxide coating on the electrode.

Thus in the prior art method of cleaning the partly finished diode housing sometimes as little as fifty percent were useable and of these often only about five to ten percent were of excellent electrical characteristics.

It is an object of this invention to provide a method of cleaning diode elements so that substantially all will have excellent electrical characteristics.

It is a further objective to provide an automatic and continuous method for cleaning partly prepared diode housings.

Figure 1:
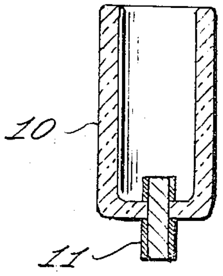
Figure 2:
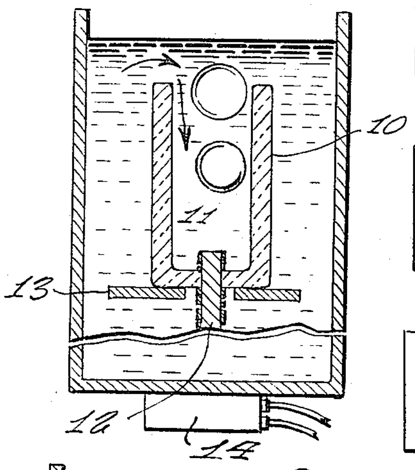
Figure 3:
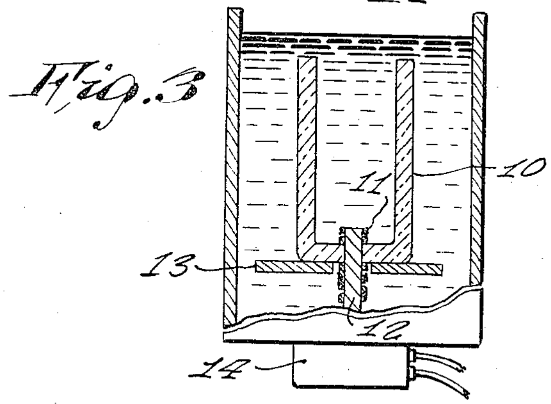
Figure 4:
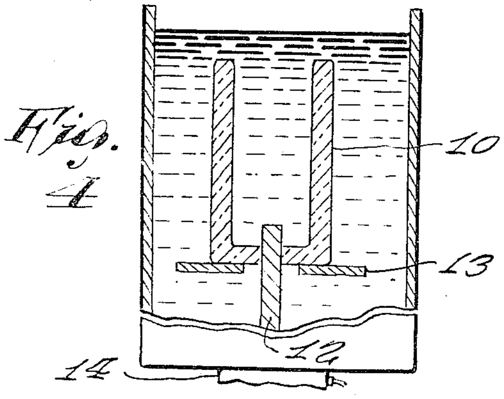
Figure 5:
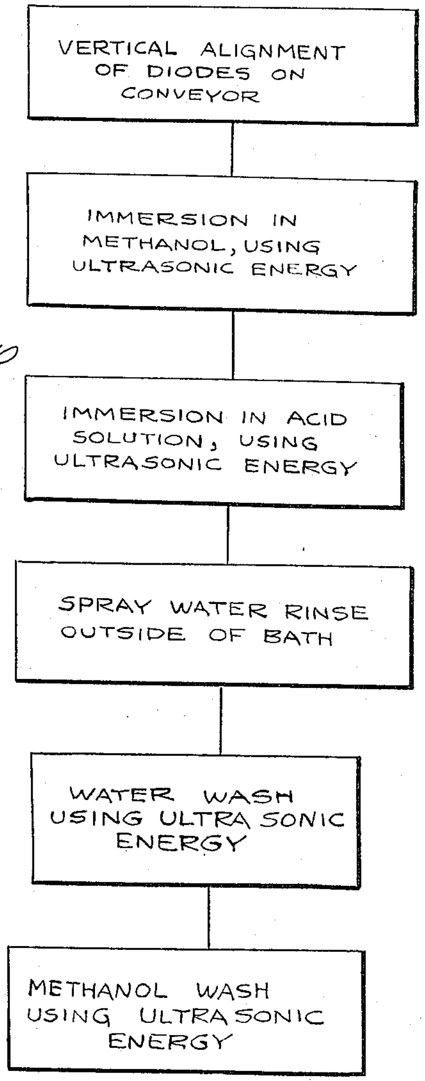

These and other objects and purposes of this invention will become apparent upon reading the following descriptive disclosure taken in conjunction with the accompanying drawing in which;

FIG. 1 is a vertical section view of an enlarged diode housing showing the dumet wire sealed in a capillary glass tube and the coating of flux and oxide on the electrode, FIG. 2 is a section view similar to that of FIG. 1 showing the housing on a conveyor immersed in a methanol bath wherein the air in the capillary is replaced by methhanol with the aid of ultrasonic energy, FIG. 3 is a view similar to that of FIG. 2 showing the manner of removing the flux and oxide in an acid bath with the aid of ultrasonic energy, FIG. 4 is a view of the cleaned electrode free of its former flux-oxide coating in a methanol bath, and FIG. 5 is a flow diagram of the various steps used to obtain a cleaned flux-oxide free electrode in said diode housings.

The essence of this invention resides in the removal of the flux-oxide coating from a metal element located deep within the capillary tube.

This flux being of a baked-on glassy character is difficult to remove from the element located deeply within a cavity.

To devise a method wherein substantially all the flux oxide coating is removed from substantially every housing is unheard of in the industry and is a process much to be desired.

According to this invention every electrode is cleaned of substantially all its flux-oxide coating to yield substantially a one hundred percent recovery of housings of excellent electrical characteristics.

While the number of steps to prepare cleaned and dried electrode housing are several, the gist of the invention resides in a few co-acting initial conceptual steps, for example, substantial vertical alignment of the housing, replacement of air with the aid of methanol or the like with ultrasonic energy and replacement of the methanol with acid solution, preferably with the aid of ultrasonic energy.

The base of the container of the methanol is attached to a conventional ultrasonic generator and is energized at between 16.5 kilocycles to 120 kilocycles. However, a 40 to 90 kilocycle operation is preferred. The dwell period in the methanol bath is about one minute or until the air in the capillary tubes is completely replaced by liquid.

Thhe positioning of the tubes vertically or substantially so, prevents the entrapment and retention of air in every tube. The use of ultrasonic energy brings about the replacement of the air by the methanol.

Next, the tubes are conveyed on the moving conveyor out of the methanol bath and into a suitable acid solution for attacking and removing the flux oxide coating. Any conventional acid solution for attacking the flux oxide may be used, for example, a three percent solution of hydrochloric acid, preferably with the aid of ultrasonic energy.

According to this invention all the capillary housings are deposited vertically onto a conventional small conveyor with the opening or mouth of the capillary tube being uppermost. The tubes may be disposed otherwise than in an absolutely vertical position, since tubes disposed at even a few degrees above the horizontal plane are operable, to permit displacement of the air as bubbles by the methanol.

The conveyor having the tubes thereon with its depending wire lead, is then conducted by conventional mechanical conveyor means into a liquid bath of, for example, substantially pure methanol preferably at room temperature. Methanol has a high degree of fluidity and volatility and has solvent cleaning powers as well. However, other highly fluid and volatile solvents such as methylene chloride, ethanol and the like are operable.

The excellent results obtained by using the method of this invention is believed to be due to replacement of the air by the methanol and the subsequent replacement of substantially all the methanol by the acid solution.

Thus when the methanol filled housings are introduced into the acid bath, the methanol is replaced by the acid solution which attacks the flux oxide coating especially by entering any tiny cracks therein attacking said coating from beneath as well as by dissolving it on its exterior exposed surface.

The acid solution may be used at room temperature but it is preferably used at about 140 degrees Fahrenheit or higher. Advantageously the ultrasonic energy employed in the acid bath is from about 16.5 to about 90 or more kilocycles. However, an energy value of about 40 kilocycles is preferred.

Moreover, where hot acid, for example 200° F. is used, it is possible to dispense with the use of ultrasonic energy in the acid bath, particularly if a longer dwell time in the acid bath is employed.

However, where ultrasonic energy is used both in the acid bath as well as in the methanol bath the desired results are obtained more rapidly, especially since the ultrasonic energy hastens the chemical attack of the acid solution because of the solution agitation effect in the vicinity of the electrode.

The capillary housings, removed on the conveyor from the acid bath, are thoroughly cleaned of all flux oxide coating and the process of this invention is for all practical purposes completed. However, in order to use commercially the cleaned diode housing it is necessary to remove all residual deleterious material thereon and to dry them thoroughly.

As shown in the drawing, the glass capillary 10 is sealed by conventional means using a conventional borate flux 11 on a dumet wire 12. The flux in FIGS. 2 and 3 is shown in dotted line to indicate schematically the fissured nature of the coating. The tube housings are conveyed on conveyor 13 from one bath to another throughout the process.

A conventional ultrasonic device 14 is secured preferably to the base of the containers and energized electrically to the desired value.

In order to remove deleterious material from the substantially flux oxide free housing, the conveyor is conducted out of the acid bath and sprayed with water to remove the bulk of clinging used acid solution.

Next the rinsed housings are conveyed into a bath or series of baths of de-ionized water preferably at 140° F. and preferably with the aid of ultrasonic energy and preferably at 40 kilocycles for about one minute.

Next, the water washed housings are conveyed into a substantially dry methanol bath or series of baths at room temperature which also is preferably energized with about 40 kilocycles of ultrasonic energy, for a dwell time of about one minute.

Next, the methanol washed housing are conveyed into a substantially anhydrous methanol bath also held preferably at room temperature and preferably at 40 kilocycles of ultrasonic energy for about one minute.

The housings are then conveyed into a heated chamber where the methanol is evaporated.

The various steps of the overall procedure are shown in the flow chart of FIG. 5. But the essence of this invention is shown in the first few steps thereof, wherein the housings are aligned vertically and the air therein is displaced and replaced with suitable solvent by use of ultrasonic energy. This solvent functions as a carrier for the subsequent introduction of the acid solution.

An example of this invention is as follows: A group of prepared housings each having a sealed-in borate coated dumet wire was aligned vertically on a conveyor adapted to receive housings. The housings were then conveyed into a bath of methanol the container of which was attached suitably to an ultrasonic generator. The generator was turned up to 40 kilocycles and the dwell period was at room temperature for about one minute. Each housing of the group had its air in the capillary completely replaced by methanol by this procedure. The methanol filled tubular housings were then conveyed out of the methanol bath and into a five percent aqueous hydrochloric acid bath.

The acid bath was secured to a conventional ultrasonic generator and run at 40 kilocycles at room temperature for one minute or until the flux oxide coating dissolved and disappeared.

At this point the desired result was accomplished since the flux oxide coating was fully removed.

The housings were then cleaned of deleterious material and dried by use of methanol and then tested.

All the housings, with the exception of one, had excellent electrical characteristics upon being tested. The one that had poor qualities was visually investigated by of magnification and found to be defective due to manufacture and not due to the failure to remove the flux oxide coating.

As a second example of this invention, the methanol filled capillary tubes were immersed on the conveyor in a 7.5 percent aqueous hydrochloric acid solution maintained at 180° F. No ultrasonic energy was employed in this acid bath. After about three minutes the electrodes were cleaned of all visible flux-oxide coating.

This invention was described by means of various solutions, temperatures, etc., but it is not limited to these variations as it is of greater scope. Thus other solvents of suitable fluidity and volitility such as methylene chloride, carbon tetrachloride, ethanol, propanol, fluorochlorohydrocarbons of low boiling point, etc., are operable in lieu of methanol. Other conventional acids than those presented above are operable, for example, aqueous oxalic acid, formic acid, sulfuric acid, etc.

Accordingly this invention is of a broad scope and is not to be limited to its illustrative embodiments presented herein.

I claim:

1. The process of cleaning flux oxide coated metallic elements fused to open end capillary tubes comprising depositing said tubes vertically with their open end uppermost, upon a conveyor; immersing said tubes while on said conveyor in a bath containing a suitably fluid liquid; energizing the liquid by means of ultrasonic energy thereby replacing the air of said tubes with said liquid; conveying said liquid filled tubes into an acid bath adapted to react with said flux oxide coating and energizing with ultrasonic energy said acid bath until said flux is completely dissolved.

2. The process of claim 1 wherein the ultrasonic energy level of both the liquid and the acid bath varies between about 16.5 to about 120 kilocycles.

3. The process of claim 2 wherein the ultrasonic level of the liquid bath is about 90 kilocycles and that of the acid bath is about 40 kilocycles.

4. The process of claim 1 wherein the flux oxide free metallic element is water washed free of deleterious material with the aid of ultrasonic energy and then solvent dried also with the aid of ultrasonic energy.

5. The process of cleaning flux oxide coated metallic element located in open end capillary tubes comprising aligning said tubes vertically with the open end uppermost; immersing said vertical tubes in a liquid bath of suitable fluidity; vibrating said liquid and said vertical tubes by means of ultrasonic energy so that the air in said tubes is replaced by said liquid and immersing the vertical liquid filled tubes in a suitably hot conventional acid solution for reaction with said flux oxide coating until said coating is dissolved.

6. The process of claim 5 wherein the flux oxide free metallic element is water washed free of deleterious materials with the aid of ultrasonic energy and then solvent dried with the aid of ultrasonic energy.

References Cited by the Examiner

UNITED STATES PATENTS

| | | | |
|---|---|---|---|
| 2,411,298 | 11/1946 | Shore | 156—17 |
| 2,619,414 | 11/1952 | Heidenreich | 156—17 |
| 2,814,575 | 11/1957 | Lange | 134—1 |
| 2,961,354 | 11/1960 | Cleveland | 134—1 |
| 3,088,888 | 5/1963 | Leff | 156—17 X |
| 3,135,274 | 6/1964 | Baldwin et al. | 134—1 X |
| 3,144,366 | 8/1964 | Rideout et al. | 156—17 X |

JOSEPH SCOVRONEK, *Acting Primary Examiner.*

J. ZATARGA, *Assistant Examiner.*